W. F. CONVERSE.
Car Spring.
No. 26,019. Patented Nov. 8, 1859.
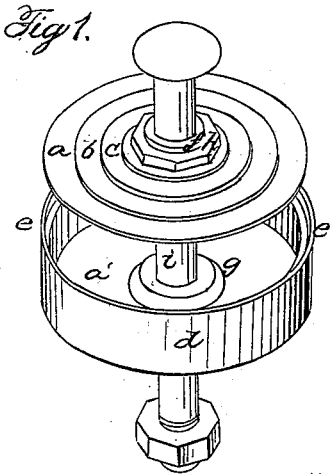
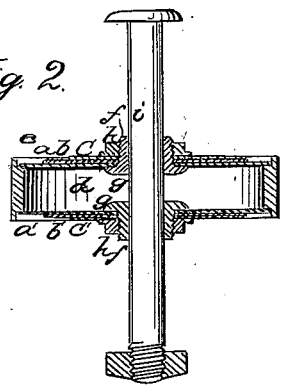
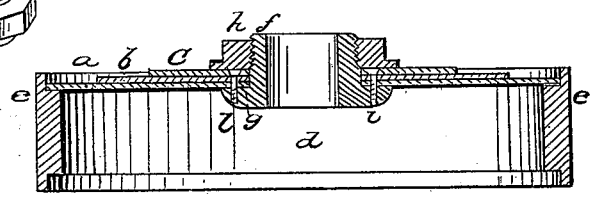
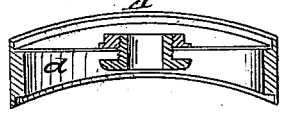
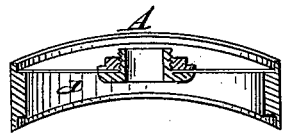
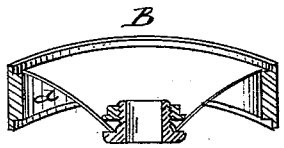
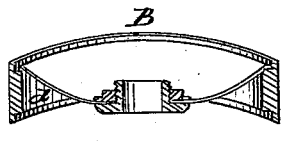
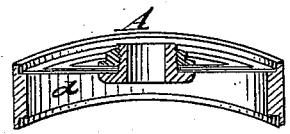
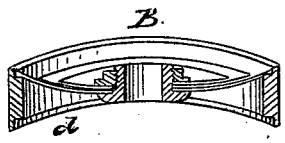

UNITED STATES PATENT OFFICE.

WM. F. CONVERSE, OF HARRISON, OHIO.

RAILROAD-CAR SPRING.

Specification of Letters Patent No. 26,019, dated November 8, 1859.

*To all whom it may concern:*

Be it known that I, WILLIAM F. CONVERSE, of Harrison, Hamilton county, Ohio, have invented a new and useful Improvement in Car-Springs; and I hereby declare the following to be a full and exact description thereof, reference being had to the accompanying drawings, making part of this specification.

My invention consists in a method of clamping steel disk springs in such manner as to insure their effective action and also in the combination of a series of concentric disks of unequal diameter.

In the accompanying drawings Figure 1 is a perspective view of a spring on my plan, with the parts somewhat detached. Fig. 2 is a transverse section. Figs. 3, 4 and 5 are diagrams illustrative of the theory of construction of the spring. Fig. 6 represents a modification of the spring.

($d$) is a cylindrical ring provided at each end with an internal rabbet $e$, affording bearing for the outer edge of an annular steel plate $a$, $a'$, which forms the first of a series of concentric disks $a\ b\ c$, $a'\ b'\ c'$, of different diameters arranged one outside the other in manner represented. The several leaves of each series respectively are held tightly together in the center by a bush $f\ g\ h$, composed of a screw $f\ g$, and nut $h$.

The screw $f\ g$, may be made hollow for the reception of a bolt $i$, which serves the purpose of a guide stem during the action of the spring. Having applied to this form of spring several severe practical tests, I have found that the secure clamping or gripping of the central margins of the disks of such a spring is essential to its effectual and permanent service as a car spring. The reason of this is easily explained as follows:—

A, Fig. 3, represents a single disk whose central part is confined but not tightly gripped by the head and nut of the bush. The outer margin being supported by the ring ($d$), let now a heavy weight be laid on the top of the bush—it will be perceived that the portion of the plate nearest the central aperture having a much slighter bearing and being subjected to greater weight than the parts beyond will suffer the greatest strain and deflection and becoming stretched and fractured will sag downward and outward as represented at B, Fig. 3 and finally will tear asunder.

A, Fig. 4, represents the same plate gripped or clamped at its central margin and subjected to the same action. The central portion being now held fast is preserved from the injurious sagging above alluded to, but still the circle immediately outside of it (see B, Fig. 4) from the same class of causes as those before explained is subject to undue deflection and straining apart by the action of the spring while the outer margin, undergoing a contractile rather than an expanding action, is almost unaffected, although both from its large surface and its entire disconnection with other parts, it is of course the part at which the chief deflection and resilient action should take place.

A, and B, Fig. 5, represent respectively the resting and deflected conditions of a pile or set composed of several plates of graduated diameter arranged and secured on my plan and in which the principal resilient duty occurs near the outer margin. In some cases instead of one, there may be two plates of the large size in each series. Also, several springs may if needful be arranged on one guide stem; or the spring may consist of but one series of disks. The disks may if preferred be firmly secured to the head of the bolt $f\ g$, by countersunk screws $l$. A washer may be interposed between the nut $h$, and the outer plate $c$.

I claim as new and of my invention herein:—

1. The combination of the clamp $f\ g\ h$ with a disk spring in the manner and for the purpose explained.

2. In connection with the above I claim the series of annular steel disks of unequal diameter arranged in manner and for the purpose described.

In testimony of which invention I hereunto set my hand.

WM. F. CONVERSE.

Attest:
GEO. H. KNIGHT,
JAS. H. GRIDLEZ.